No. 643,763. Patented Feb. 20, 1900.
J. A. DRAKE.
WEIGHER AND CHARGER FOR GAS RETORTS.
(Application filed Oct. 13, 1899.)
(No Model.) 2 Sheets—Sheet 1.

Witnesses.
A. G. Heylmun.
Gobie Heylmun.

Inventor.
John A. Drake.
by Herbert W. T. Jenner.
Attorney.

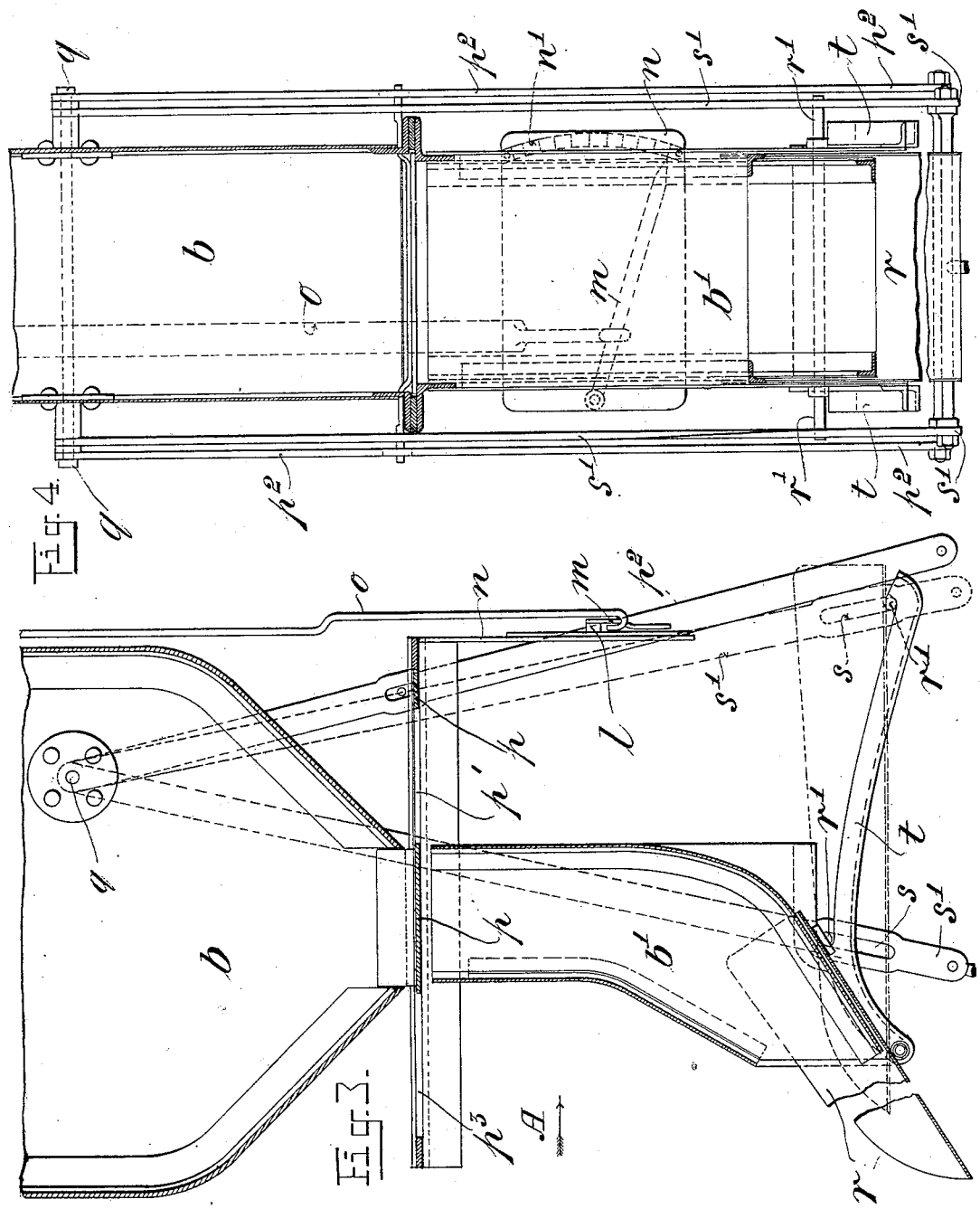

UNITED STATES PATENT OFFICE.

JOHN ARMITAGE DRAKE, OF OVENDEN, ENGLAND.

WEIGHER AND CHARGER FOR GAS-RETORTS.

SPECIFICATION forming part of Letters Patent No. 643,763, dated February 20, 1900.

Application filed October 13, 1899. Serial No. 733,525. (No model.)

*To all whom it may concern:*

Be it known that I, JOHN ARMITAGE DRAKE, a subject of the Queen of Great Britain, residing at Ovenden, near Halifax, in the county of York, England, have invented certain new and useful Improvements in Apparatus for Weighing and Delivering Coal or Fuel to Inclined Gas-Retorts; and I do hereby declare the following to be a full, clear, and exact description of the invention, such as will enable others skilled in the art to which it appertains to make and use the same.

This invention relates to apparatus for delivering coal or fuel to inclined gas-retorts in given quantities.

The object of my invention is to combine with a hopper or pan and removable chute new and novel means whereby the coal or fuel supplied to the hopper or pan will be weighed and the weight of coal deposited therein indicated by a pointer moving over a graduated scale on a dial or plate, so that the workman can discharge it into the chute for delivery into the mouth of the retort when the given weight is indicated, and thus supply uniform given measures of fuel to the retorts.

To the aforesaid purpose my invention consists in the novel and peculiar construction and arrangement of parts, as hereinafter described.

Figure 1:
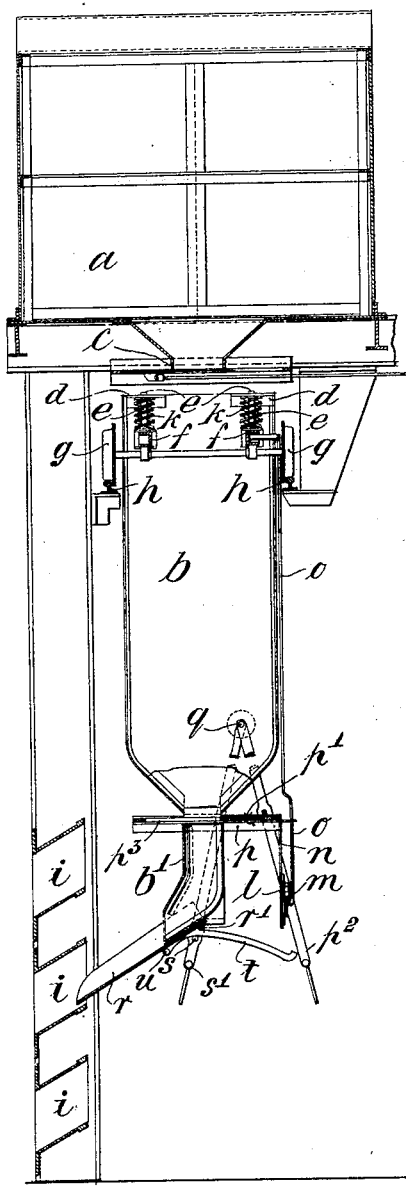
Figure 2:
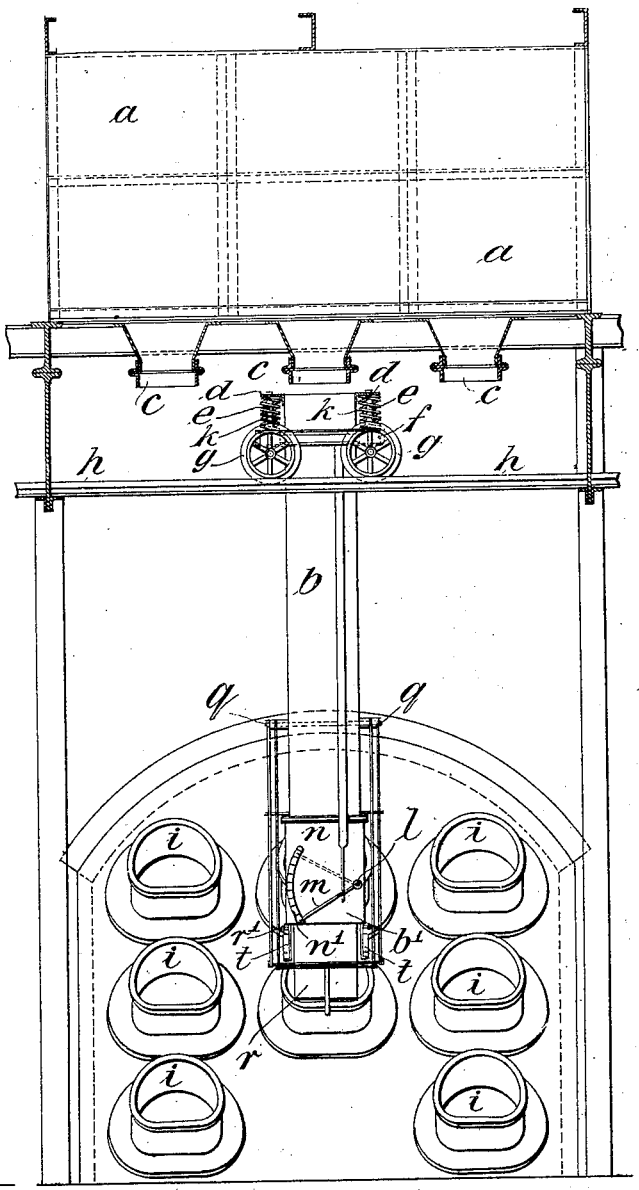

In the drawings illustrating my invention, Figure 1 is a transverse elevation, partly in section, of apparatus for delivering coal to gas-retorts embodying my invention. Fig. 2 is a front elevation of Fig. 1, part being in section. Fig. 3 is an enlarged transverse sectional elevation of the lower part of the weigh and measuring pan or hopper and removable chute; and Fig. 4 is a reversed elevation looking in the direction of arrow A, Fig. 3, part of same being in section.

Referring to the drawings, letter $a$ denotes the ordinary coal-carrying hopper for supplying coal to the weigh and measuring pan or hopper $b$, said hopper $a$ being provided at each outlet-orifice with sliding dampers or valves $c$ for opening or closing same. The weigh and measuring pan or hopper $b$ has flanges or brackets $d$ secured to its upper end, these being situated at each side of the pan, both in the front and rear thereof, and having openings therein, through which pass loosely pins or spindles $e$, secured to a trolley car or carriage $f$, mounted on wheels $g$, adapted to ride over lines $h$, extended across the front of the retorts $i$, to convey the pan or hopper from one position to another in line with or opposite to each tier of retorts to deliver fuel thereto. Surrounding the spindles $e$ and engaging at one end with the under faces of the flanges or brackets $d$ and at the opposite ends with the framework of the trolley-car $f$ are strong springs $k$, which support the pan $b$, in the form of a balance or scale, the springs being of the description commonly used in spring-balances and tested to support within the limits of compression the maximum load which the apparatus may be constructed to receive. Under different loads of fuel up to and including the maximum load the scale-pan $b$ will therefore lower or descend against the compression of springs $k$, varying given distances, which will always approximately be the same for every corresponding load subsequently deposited in the weigh-pan. To the plate $n$, secured to the front of the throat or outlet $b'$, is secured a pin $l$, upon which is fulcrumed a pointer $m$, which is adapted, as afterward explained, to move radially over the plate $n$, attached to a part of the weighpan and having a graduated scale $n'$ marked thereon, the said scale being graduated and marked off to denote the various weights represented by the gradual descent of the pan $b$ with each increase in load of fuel deposited therein from the normal or zero point to the maximum weight which the scale-pan is intended to hold. To the framework of the trolley-car $f$ is secured a vertical depending rod or bar $o$, whose lower end is provided with an opening or hook large enough for the pointer $m$ to pass through or to be engaged therein. This rod or bar having no vertical movement causes the pointer $m$, when it descends with the pan $b$, to move upward over the graduated scale $n'$ to any point up to the maximum weight marked off on the same, and therefore on arriving opposite any figure denoting the predetermined weight of fuel required to be supplied to the retorts the workman can see at a glance that the given weight of fuel is in the pan and shut off further admission of coal thereto. When emptied of its load of coal or fuel and the pan $b$ rises to its normal position again, the pointer $m$ moves by gravity downwardly or in the reverse direction back to the zero-point on the scale in readiness for the next weight of fuel.

The weigh-pan $b$ is provided at the bottom with a sliding damper $p$, one half of which has an open space $p'$ therein, while the other half is blank or solid. When the retorts require charging with the given weight of coal deposited in the weigh and measuring pan $b$, the workman actuates the lever $p^2$, centered at $q$, and such lever being connected to the damper the latter is slid endwise in ways $p^3$ from the position shown in the drawings to remove the blank or solid part of the damper away from the bottom of the weigh-pan and bring the open space $p'$ opposite thereto, whereby the coal is allowed to fall into and down the throat $b'$ into the chute $r$, which conveys it direct into the retort $i$. The chute $r$ is provided at its rear or upper edges with bowls or studs on cross-rod $r'$, extending through and engaged by the sides of slots $s$ in levers $s'$, also centered at $q$. The studs on cross-rod $r'$ rest upon curved side angle plates or brackets to support the rear end of the chute, while the front end of said chute bears upon and is supported by a fixed cross-bar $u$, over which it is adapted to ride and move about just as on a pivot. By drawing the levers $s'$ outwardly to the position shown in dotted lines in Fig. 3 the chute $r$ is withdrawn from the retort to a position of rest, as is also shown in dotted lines in Fig. 3, the studs on cross-rod $r$ riding over the curved surfaces $t$ and being supported thereby.

I claim as my invention—

The combination, with elevated rails, and a wheeled carriage running on them; of a measuring-hopper supported by the carriage and depending between the wheels and axles thereof, springs interposed between the said hopper and carriage, a plate supported from the hopper below the carriage and provided with a projecting pin and a graduated scale, a pointer pivoted on the said pin, and a depending rod rigidly secured to the said carriage and operatively connected with the said pointer, substantially as set forth.

In testimony whereof I affix my signature in presence of two witnesses.

JOHN ARMITAGE DRAKE.

Witnesses:
FRANK LEWIN,
LEONARD CROSSLEY.